United States Patent
Niederst et al.

(10) Patent No.: US 9,944,749 B2
(45) Date of Patent: Apr. 17, 2018

(54) POLYCARBONATES

(71) Applicant: Valspar Sourcing, Inc., Minneapolis, MN (US)

(72) Inventors: Jeffrey Niederst, Leechburg, PA (US); Richard H. Evans, Wexford, PA (US); Robert M. O'Brien, Monongahela, PA (US); Kevin Romagnoli, Pittsburgh, PA (US); T. Howard Killilea, North Oaks, MN (US); Mark S. Von Maier, Harmony, PA (US); Dan G. Hartinger, Hudson, WI (US)

(73) Assignee: SWIMC, LLC, Cleveland, OH (US)

( * ) Notice: Subject to any disclaimer, the term of this patent is extended or adjusted under 35 U.S.C. 154(b) by 505 days.

(21) Appl. No.: 14/417,993

(22) PCT Filed: Mar. 15, 2013

(86) PCT No.: PCT/US2013/032262
§ 371 (c)(1),
(2) Date: Jan. 28, 2015

(87) PCT Pub. No.: WO2014/025407
PCT Pub. Date: Feb. 13, 2014

(65) Prior Publication Data
US 2015/0259471 A1    Sep. 17, 2015

Related U.S. Application Data

(60) Provisional application No. 61/681,598, filed on Aug. 9, 2012.

(51) Int. Cl.
*B29D 22/00* (2006.01)
*C08G 64/06* (2006.01)
*B65D 85/72* (2006.01)

(52) U.S. Cl.
CPC ............. *C08G 64/06* (2013.01); *B65D 85/72* (2013.01); *Y10T 428/1352* (2015.01)

(58) Field of Classification Search
CPC ...... C08G 64/307; B29D 22/00; B29D 33/00; B32B 1/08; C07C 37/20
USPC .................................. 428/34.1, 35.7, 36.91
See application file for complete search history.

(56) References Cited

U.S. PATENT DOCUMENTS

| | | | |
|---|---|---|---|
| 3,085,992 A | 4/1963 | Lee et al. |
| 3,153,008 A | 10/1964 | Fox |
| 3,220,974 A | 11/1965 | Fox |
| 3,275,601 A | 9/1966 | Schnell et al. |
| 3,491,111 A | 1/1970 | Lin |
| 3,491,112 A | 1/1970 | Lin |
| 3,491,116 A | 1/1970 | Lin |
| 3,509,174 A | 4/1970 | Lin |
| 3,539,375 A | 11/1970 | Baum |
| 3,624,107 A | 11/1971 | Lin |
| 3,627,787 A | 12/1971 | Lin |
| 3,641,011 A | 2/1972 | Lin et al. |
| 3,642,828 A | 2/1972 | Farber et al. |
| 3,681,390 A | 8/1972 | Lin |
| 3,775,424 A | 11/1973 | Farber |
| 3,853,869 A | 12/1974 | Farber |
| 3,879,348 A | 4/1975 | Serini et al. |
| 3,888,812 A | 6/1975 | Plettner |
| 3,920,510 A | 11/1975 | Hatano et al. |
| 3,959,571 A | 5/1976 | Yahagi et al. |
| RE28,862 E | 6/1976 | Siemonsen et al. |
| 3,971,808 A | 7/1976 | Baumann et al. |
| 4,011,184 A | 3/1977 | van Reijendam et al. |
| 4,076,764 A | 2/1978 | Bauer |
| 4,111,910 A | 9/1978 | Baggett |
| 4,172,103 A | 10/1979 | Serini et al. |
| 4,333,809 A | 6/1982 | Schreckenberg et al. |
| 4,368,315 A | 1/1983 | Sikdar |
| 4,374,233 A | 2/1983 | Loucks et al. |
| 4,468,483 A | 8/1984 | Yeakey et al. |
| 4,510,513 A | 4/1985 | Yamaguchi et al. |
| 4,522,984 A | 6/1985 | Watanabe et al. |
| 4,564,655 A | 1/1986 | Liu |
| 4,611,036 A | 9/1986 | Sekiguchi et al. |
| 4,657,941 A | 4/1987 | Blackwell et al. |
| 4,696,955 A | 9/1987 | Kuhlmann |
| 4,729,983 A | 3/1988 | Satake et al. |
| 4,794,102 A | 12/1988 | Petersen et al. |
| 4,794,156 A | 12/1988 | Ho et al. |
| 4,816,495 A | 3/1989 | Blackwell et al. |
| 4,849,502 A | 7/1989 | Evans et al. |
| 4,994,217 A | 2/1991 | Banevicius et al. |

(Continued)

FOREIGN PATENT DOCUMENTS

| EP | 0 265 791 A2 | 5/1988 |
|---|---|---|
| EP | 0 313 862 A2 | 5/1989 |

(Continued)

OTHER PUBLICATIONS

U.S. Appl. No. 14/417,970, filed Jan. 28, 2015, Jeffrey Niederst et al., (This application is a 371 of PCT/US2013/032639).
U.S. Appl. No. 14/420,036, filed Feb. 6, 2015, Jeffrey Niederst et al., (This application is a 371 of PCT/US2013/032257).
U.S. Appl. No. 14/418,014, filed Jan. 28, 2015, Jeffrey Niederst et al., (This application is a 371 of PCT/US2013/31979).
U.S. Appl. No. 14/418,040, filed Jan. 28, 2015, Jeffrey Niederst et al., (This application is a 371 of PCT/US2013/032648).
Fang, H. et al.., "Structure-Activity Relationships for a Large Diverse Set of Natural, Synthetic, and Environmental Estrogens." Chem. Res. Toxicol, vol. 14, No. 3, pp. 280-294 (2001).

(Continued)

*Primary Examiner* — Ellen S Wood
(74) *Attorney, Agent, or Firm* — Patterson Thuente Pedersen, P.A.

(57) ABSTRACT

Polycarbonates made from polyhydric phenols that preferably exhibit estrogenic activity less than bisphenol S exhibit properties such as high impact strengths, moderate to high glass transition temperatures, chemical resistance, and good color and clarity similar to conventional BPA-derived polycarbonates.

21 Claims, No Drawings

(56) References Cited

U.S. PATENT DOCUMENTS

| | | | |
|---|---|---|---|
| 5,010,147 | A | 4/1991 | Westeppe et al. |
| 5,032,567 | A | 7/1991 | Ohtsubo et al. |
| 5,068,284 | A | 11/1991 | Ullman et al. |
| 5,080,961 | A | 1/1992 | Macy et al. |
| 5,102,608 | A | 4/1992 | Frencken et al. |
| 5,288,839 | A | 2/1994 | Greco |
| 5,318,899 | A | 6/1994 | Mitra et al. |
| 5,446,009 | A | 8/1995 | Minami et al. |
| 5,494,950 | A | 2/1996 | Asakage et al. |
| 5,496,921 | A | 3/1996 | Sakashita et al. |
| 5,576,413 | A | 11/1996 | Bussink et al. |
| 5,591,788 | A | 1/1997 | Anderson et al. |
| 5,803,301 | A | 9/1998 | Sato et al. |
| 5,807,912 | A | 9/1998 | Wu et al. |
| 5,859,172 | A | 1/1999 | Sakashita et al. |
| 5,876,210 | A | 3/1999 | Klee et al. |
| 5,880,248 | A | 3/1999 | Sakashita et al. |
| 6,043,333 | A | 3/2000 | Kuboki et al. |
| 6,048,931 | A | 4/2000 | Fujita et al. |
| 6,060,577 | A | 5/2000 | Davis |
| 6,103,311 | A | 8/2000 | Masuda et al. |
| 6,133,402 | A | 10/2000 | Coates et al. |
| 6,184,339 | B1 | 2/2001 | Stansbury et al. |
| 6,225,436 | B1 | 5/2001 | Eiffler et al. |
| 6,399,738 | B1 | 6/2002 | Ito |
| 6,469,127 | B1 | 10/2002 | Furunaga et al. |
| 6,566,426 | B1 | 5/2003 | Kanaida et al. |
| 6,579,829 | B2 | 6/2003 | Nishimura et al. |
| 6,608,163 | B2 | 8/2003 | Bailly et al. |
| 6,660,688 | B2 | 12/2003 | Yamada et al. |
| 6,723,765 | B2 | 4/2004 | Bammel |
| 6,833,398 | B2 | 12/2004 | Agarwal et al. |
| 6,844,071 | B1 | 1/2005 | Wang et al. |
| 6,916,874 | B2 | 7/2005 | Mazza et al. |
| 6,924,328 | B2 | 8/2005 | Legleiter et al. |
| 6,984,262 | B2 | 1/2006 | King et al. |
| 6,984,608 | B2 | 1/2006 | Makitalo et al. |
| 7,022,765 | B2 | 4/2006 | Adedeji et al. |
| 7,087,705 | B2 | 8/2006 | Ashtekar et al. |
| 7,141,359 | B2 | 11/2006 | Suga et al. |
| 7,256,228 | B2 | 8/2007 | Agarwal et al. |
| 7,332,560 | B2 | 2/2008 | Heuer et al. |
| 7,635,662 | B2 | 12/2009 | Kabashima et al. |
| 7,682,674 | B2 | 3/2010 | Vogt et al. |
| 7,803,439 | B2 | 9/2010 | Crawford et al. |
| 7,803,440 | B2 | 9/2010 | Crawford et al. |
| 8,124,669 | B2 | 2/2012 | Terakawa et al. |
| 8,142,858 | B2 | 3/2012 | Cooke et al. |
| 8,353,657 | B2 | 1/2013 | Lat et al. |
| 8,795,830 | B2 | 8/2014 | Wyman et al. |
| 8,906,507 | B2 | 12/2014 | Campbell et al. |
| 9,096,772 | B2 | 8/2015 | Lespinasse et al. |
| 9,168,206 | B2 | 10/2015 | Wang et al. |
| 2003/0181628 | A1 | 9/2003 | Horn et al. |
| 2003/0203991 | A1 | 10/2003 | Schottman et al. |
| 2003/0209553 | A1 | 11/2003 | Horn et al. |
| 2004/0044101 | A1 | 3/2004 | Hirose et al. |
| 2004/0176563 | A1 | 9/2004 | Shinohara et al. |
| 2004/0220372 | A1 | 11/2004 | Qi et al. |
| 2004/0242723 | A1 | 12/2004 | Jin et al. |
| 2005/0014004 | A1 | 1/2005 | King et al. |
| 2005/0090593 | A1 | 4/2005 | Heuer et al. |
| 2005/0118526 | A1 | 6/2005 | Suga et al. |
| 2006/0025559 | A1 | 2/2006 | Wehrmann et al. |
| 2006/0052523 | A1 | 3/2006 | Bushendorf et al. |
| 2006/0134541 | A1 | 6/2006 | Fuji et al. |
| 2007/0036903 | A1 | 2/2007 | Mayr et al. |
| 2007/0087146 | A1 | 4/2007 | Evans et al. |
| 2007/0099130 | A1 | 5/2007 | Takahashi et al. |
| 2008/0246173 | A1 | 10/2008 | Braidwood et al. |
| 2008/0314500 | A1 | 12/2008 | Boers et al. |
| 2008/0319156 | A1 | 12/2008 | Fischer et al. |
| 2009/0326107 | A1 | 12/2009 | Bittner |
| 2010/0056721 | A1 | 3/2010 | Wright et al. |
| 2010/0086716 | A1 | 4/2010 | Rüdiger et al. |
| 2011/0003267 | A1 | 1/2011 | Terakawa et al. |
| 2011/0042338 | A1 | 2/2011 | Pecorini et al. |
| 2011/0160408 | A1 | 6/2011 | de Brouwer et al. |
| 2011/0275035 | A1 | 11/2011 | Lu |
| 2011/0315591 | A1 | 12/2011 | Lespinasse et al. |
| 2012/0125800 | A1 | 5/2012 | Doreau et al. |
| 2012/0172568 | A1 | 7/2012 | Ueda |
| 2012/0276315 | A1 | 11/2012 | Michel et al. |
| 2012/0276503 | A1 | 11/2012 | Wang et al. |
| 2013/0206756 | A1 | 8/2013 | Niederst |
| 2013/0280455 | A1 | 10/2013 | Evans et al. |
| 2013/0316109 | A1 | 11/2013 | Niederst et al. |
| 2014/0113093 | A1 | 4/2014 | Corbin et al. |

FOREIGN PATENT DOCUMENTS

| | | |
|---|---|---|
| EP | 0185118 B1 | 9/1995 |
| JP | H07-126574 A | 5/1995 |
| JP | H07-138502 A | 5/1995 |
| JP | 08-230328 | 9/1996 |
| JP | 2002-097250 A | 4/2002 |
| JP | 2002-138245 A | 5/2002 |
| JP | 2003-176348 A | 6/2003 |
| JP | 3 484546 B2 | 1/2004 |
| JP | 2004-10874 A | 1/2004 |
| WO | WO 95/26997 | 10/1995 |
| WO | WO 97/28905 | 8/1997 |
| WO | WO 98/50477 | 11/1998 |
| WO | WO 00/71337 A1 | 11/2000 |
| WO | WO 2007/048094 A2 | 4/2007 |
| WO | WO 2008/137562 A1 | 11/2008 |
| WO | WO 2009/015493 A1 | 2/2009 |
| WO | WO 2010/118349 A1 | 10/2010 |
| WO | WO 2010/118356 A1 | 10/2010 |
| WO | WO 2011/130671 A2 | 10/2011 |
| WO | WO 2012/109278 A2 | 8/2012 |
| WO | WO 2014/140233 A1 | 9/2014 |
| WO | WO 2014/140234 A1 | 9/2014 |

OTHER PUBLICATIONS

Meti, "Current Status of Testing Methods Development for Endocrine Distrupters." 6th Meeting of the Task Force on Edocrine Distrupters Testing and Assessment (EDTA), Tokyo, Ministry of Economy, Trade and Industry, Japan, 70 pages (Jun. 24-25, 2002).

Kitamura, S., et al., "Comparative Study of the Endocrine-Disrupting Activity of Bisphenol A and 19 Related Compounds," Toxicological Sciences, vol. 84, 249-259, doi:10.1093/toxcie/kfi074, Advance Access publication, 11 pages (Jan. 5, 2005).

Liu Z., et al., "Preparation, characterization and thermal properties of tetramethylbisphenol F exposy resin and mixed systems," Polym Int 2012; 61: 565-570, © 2011 Society of Chemical Industry, published online in Wiley Online Library: 6 pages (Nov. 10, 2011).

Fang H., et al., "Quantitative Comparisons of in Vitro Assays for Estrogenic Activities," Environmental Health Perspectives, vol. 108, No. 8, pp. 723-729, 7 pages (Aug. 2000).

"Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEATM) on Jan. 19, 2006 (102 pages, available online at ntp.niehs.nih.gov/iccvam/methods/endocrine/endodocs/submdoc.pdf).

Matasa, C., et al., "A wish list for orthodontic materials, 2005" The Orthodontic Materials Insider, vol. 16 Nr, 4, 8 pages (Dec. 2004).

Moss, G.P., "Extension and Revision of the Von Baeyer System for Naming Polycyclic Compounds (Including Bycyclic Compounds)", IUPAC Recommendations 1999, Pure Appl. Chem., vol. 71, No. 3, pp. 513-529, 17 pages (1999).

Song, K., et al., :Endocrine Disrupter Bisphenol A Induces Orphan Nuclear Receptor Nur77 Gene Expression and Steroidogenesis in Mouse Testicular Leydig Cells, Endocrinology 143(6):2208-2215, Copyright 2002 by The Endocrine Society, 8 pages.

Kobayashi, S. et al., "Stereo Structure-Controlled and Electronic Structure-Controlled Estrogen-Like Chemicals to Design and Develop Non-estrogenic Bisphenol A Analogs Based on Chemical

(56) References Cited

OTHER PUBLICATIONS

Hardness Concept," Chem. Pharm. Bull. 54(12):1633-1638, 2006 Pharmaceutical Society of Japan, 6 pages (Dec. 2006).
"Flame Retardant Bisphenol F", Product Information Sheets, Nippon Kasei Chemical, 2 pages(2013).
Eastman, "Eastman TritanTM Copolyester—Lack of estrogen and testosterone activity," TRS-270, 3 pages (Apr. 2010).
Viñas, P. et al, "Comparison of two derivatization-based methods for solid-phase microextraction-gas chromotography-mass spectrometric determination of bisphenol A, bisphenol S. and bisphenol migarted from food cans," published online Feb. 3, 2010, Springer-Verlag, 11 pages (2010).
DYTEK® A-Amine (2014) downloaded from the Oct. 16, 2014 Internet Archives capture at https://web.archive.org/web/20141016043145/http://dytek.invista.com/Products/Amines/dytek-a-amine.
Tice, R.R. "The single cell gel/comet assay: a microgel electrophoretic technique for the detection of DNA damage and repair in individual cells." Environmental Mutagenesis, Eds. Phillips, D.H and Venitt, S. Bios Scientific, Oxford, UD, pp. 315-339 (1995).
Woo, B. et al., Melt Polycondensation of Bisphenol A Polycarbonate by a Forced Gas Sweeping Process, Ind. Eng. Chem. Res., vol. 40, No. 5, pp. 1312-1319 (2001).
Polycarbonates, $4^{th}$-5th Edition, Kirk-Othmer Encyclopedia of Chemical Technology, pp. 1-30 (2000).
Porter, D. S. et al., Hot-Fill Containers, New Tech for OPP & PET, Plastics Technology, Eastman Chemical Co., 6 pages (Dec. 2007).
Grace Darex® Packaging Technologies, A Global Partner for your global business, Product Book, 4 pages (2006).
Mendum, T. et al., "Research Letter, Concentration of bisphenol A in thermal paper", Green Chemistry Letters and Reviews, vol. 4, No. 1, pp. 81-86 (Mar. 2011).
Matsumoto, S. et al., "The crystal structure of two new developers for high-performance thermo-sensitive paper: H-bonded network in urea-urethane derivatives", Dyes and Pigments, 85, pp. 139-142 (2010).

POLYCARBONATES

CROSS REFERENCE TO RELATED APPLICATIONS

This application is a national stage filing under 35 U.S.C. § 371 of International Application No. PCT/US2013/032262 filed Mar. 15, 2013, which claims priority under 35 U.S.C. § 119 to U.S. Provisional Application No. 61/681,598 filed Aug. 9, 2012, the disclosures of both of which are incorporated herein by reference.

FIELD

This invention relates to polycarbonates and polycarbonate-containing articles.

BACKGROUND

Polycarbonates are polymers that contain a plurality of carbonate groups (—O—C=O)—O—), and typically derived by reacting a polyhydric phenol such as bisphenol A (BPA) and phosgene (carbonyl chloride). Polycarbonates have many desirable properties (e.g. thermal stability, good electrical properties and high impact strength) making them valuable in commercial and industrial applications (e.g. electronic components, automotive components, or medical equipment).

A drawback to BPA-derived polycarbonates is the potential leaching or migration of unreacted BPA, which is undesirable.

SUMMARY

The present invention provides novel polycarbonates that provide an improvement over conventional polycarbonates because they contain little or no BPA. The disclosed polycarbonates are made from polyhydric phenols having low estrogenicity.

The present invention provides, in one aspect, a food contact or beverage contact article comprising a polycarbonate comprising a reaction product of a polyhydric phenol and a carbonate precursor defined below, wherein the polyhydric phenol comprises (i) a polyhydric phenol having one or more aryl or heteroaryl groups in which each aryl or heteroaryl group includes an oxygen atom attached to the ring and a substituent group attached to the ring at an ortho or meta position relative to the oxygen atom, and the substituent group is free of halogen atoms; (ii) a polyhydric phenol having two or more aryl or heteroaryl groups joined by a polar linking group or by a linking group having a molecular weight of at least 125 Daltons; or (iii) a polyhydric phenol having the features of both (i) and (ii); and the article or polycarbonate is substantially free of polyhydric phenols having estrogenic activity greater than or equal to that of bisphenol S.

The present invention provides, in another aspect, an article comprising a polycarbonate containing one or more segments shown in Formula (I):

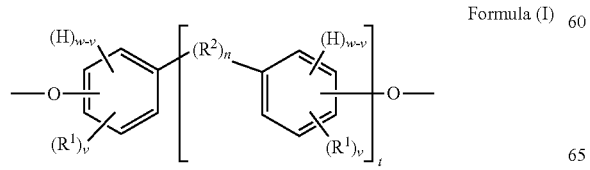

Formula (I)

wherein:
each of the oxygen atoms depicted in Formula (I) is preferably part of a carbonate linkage;
H denotes a hydrogen atom, if present;
each $R^1$ is independently an atom or group having an atomic weight of at least 15 Daltons;
v is independently 0 to 4; preferably 1 to 4; with the proviso that if v is 0, then n is 1 or the phenylene groups depicted in Formula I join to form a fused ring system
w is 4;
$R^2$, if present, is a divalent group;
n is 0 or 1; with the proviso that if n is 0, the phenylene groups depicted in Formula I can optionally join to form a fused ring system in which case w is 3 and v is 0 to 3;
t is 0 or 1;
if v is 0, t is 1 then $R^2$ is a polar linking group or a linking group having a molecular weight of at least 125 Dalton;
two or more $R^1$ or $R^2$ groups can join to form one or more cyclic groups; and the polycarbonate is preferably substantially free of polyhydric phenols having estrogenic activity greater than or equal to that of bisphenol S.

When t is 1, the segment of Formula (I) is a segment of the below Formula (IA):

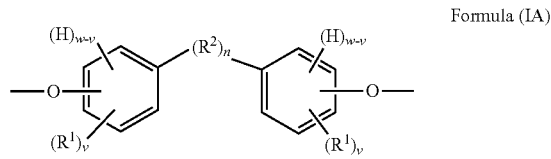

Formula (IA)

When t is 0, the segment of Formula (I) is a segment of the below Formula (IB):

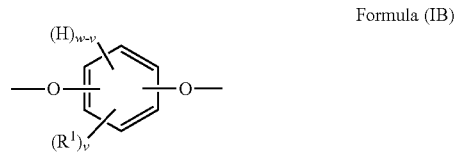

Formula (IB)

The present invention provides, in another aspect, a method of making a food contact or beverage contact article comprising a polycarbonate polymer, comprising:
reacting a carbonate precursor and a polyhydric phenol of Formula II:

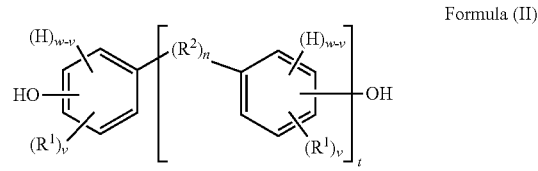

Formula (II)

wherein H, $R^1$, $R^2$, v, w, n and t are as described for Formula (I) above.

Definitions

As used herein, "a," "an," "the," "at least one," and "one or more" are used interchangeably. Thus, for example, a polycarbonate that includes "a" polyhydric phenol includes "one or more" polyhydric phenols.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon for example nitrogen, oxygen, sulfur, and the like. Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, and the like).

The term "beverage contact" when used with respect to a surface refers to an interior surface of any vessel configured to hold consumable fluid including fluid prepared, purified or processed fluids. Illustrative examples of beverage contact surfaces include interior surfaces of baby bottles, sport bottles, water bottles, jugs, mugs, glasses and the like.

The term "BPA" refers to bisphenol A (also known as 4,4'-(propane-2,2-diyl)polyhydric phenol; pp'-isopropylidenebisphenol or 2,2-bis(4-hydroxyphenyl)propane).

The term "BPS" refers to bisphenol S (also known as 4,4'-sulfonylbisphenol or bis(4-hydroxyphenyl)sulfone).

The term "carbonate precursor" refers to a carbonyl halide, a carbonate ester derived from mono-functional alcohols or phenols or mixtures thereof, or bishaloformate that may be used to react with polyhydric phenols to provide a polymer having carbonate linkages between repeating units.

The terms "comprises" and variations thereof do not have a limiting meaning where these terms appear in the description and claims.

The term "crosslinker" refers to a molecule capable of forming a covalent linkage between polymers or between two different regions of the same polymer.

The terms "estrogenic activity" "estrogenic agonist activity" refers to the ability of a compound to mimic hormone-like activity through interaction with an endogenous estrogen receptor, typically an endogenous human estrogen receptor.

The term "food contact" means any surface that food comes into contact with during the storage, preparation or serving of the food. Illustrative examples of food contact surfaces include food or beverage packaging, cookware, cutlery, tableware, and food processing machinery and equipment.

A group that may be the same or different is referred to as being "independently" something.

The term "mobile" when used with respect to a compound means that the compound can be extracted from a polycarbonate polymer when a polycarbonate polymer is exposed to a test medium for some defined set of conditions, depending on the end use. An example of these testing conditions is exposure of the polycarbonate polymer to HPLC-grade acetonitrile for 24 hours at 25° C. As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The term "phenylene" as used herein refers to a six-carbon atom aryl ring (e.g., as in a benzene group) that can have any substituent groups (including, e.g., halogen atoms, hydrocarbon groups, oxygen atoms, hydroxyl groups, and the like). Thus, for example, the following aryl groups are each phenylene rings: —$C_6H_4$—, —$C_6H_3(CH_3)$—, and —$C_6H(CH_3)_2Cl$—. In addition, for example, each of the aryl rings of a naphthalene group is a phenylene ring.

The term "polyhydric phenol" as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

Unless otherwise indicated, the term "polymer" includes both homopolymers and copolymers (e.g., polymers of two or more different monomers). Similarly, unless otherwise indicated, the use of a term designating a polymer class such as, for example, "polycarbonate" is intended to include both homopolymers and copolymers (e.g., a polycarbonate made from two or more different polyhydric phenols or diols).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "substantially free" when used with respect to a polymer or composition that may contain a particular mobile compound means that the recited polymer or composition contains less than 1,000 parts per million (ppm) of the recited mobile compound. The term "essentially free" of a particular mobile compound means that the recited polymer or composition contains less than 100 parts per million (ppm) of the recited mobile compound. The term "essentially completely free" of a particular mobile compound means that the recited polymer or composition contains less than 5 parts per million (ppm) of the recited mobile compound. The term "completely free" of a particular mobile compound means that the recited polymer or composition contains less than 20 parts per billion (ppb) of the recited mobile compound. If the aforementioned phrases are used without the term "mobile" (e.g., "substantially free of BPA") then the recited polycarbonate contains less than the aforementioned amount of the compound whether the compound is mobile in the polycarbonate or bound to a constituent of the polycarbonate.

The organic groups of the compounds may be substituted. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substituents. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, and the like. Thus, "alkyl group" includes ether groups, haloalkyls, nitroalkyls, carboxyalkyls, hydroxyalkyls, sulfoalkyls, and the like. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

Also herein, the recitations of numerical ranges by endpoints include all numbers subsumed within that range (e.g., 1 to 5 includes 1, 1.5, 2, 2.75, 3, 3.80, 4, 5, and the like). Furthermore, disclosure of a range includes disclosure of all subranges included within the broader range (e.g., 1 to 5 discloses 1 to 4, 1.5 to 4.5, 4 to 5, and the like).

DETAILED DESCRIPTION

Polycarbonates typically are prepared from a polyhydric phenol reactant (e.g. such as BPA) and a carbonate precursor. The typical carbonate precursor is phosgene (carbonyl chloride) or diphenyl carbonate. While any known method may be used in the preparation of the disclosed polycarbonates, two main methods may be used, namely Schotten-Baumann reaction of phosgene and an aromatic diol in an amine-catalyzed interfacial condensation reaction (interfacial process) or via base-catalyzed transesterification of a bisphenol with a monomeric carbonate such as diphenyl carbonate (transesterification process).

Polycarbonates have traditionally contained BPA derivatives as the base polymeric components. These components have provided exceptional properties such as high durability, chemical resistance and desirable optical properties. The disclosed polyhydric phenols are an effective replacement for BPA-derived polycarbonates. The resulting polycarbonates are preferably substantially free, more preferably essentially free and most preferably completely free of BPA and BPS.

The ingredients used to make the disclosed polycarbonates are preferably free of any polyhydric phenols that exhibit an estrogenic agonist activity in the MCF-7 assay discussed below greater than or equal to that that exhibited by 4,4'-(propane-2,2-diyl)diphenol in the assay. More preferably, the aforementioned ingredients are free of any polyhydric phenols that exhibit an estrogenic agonist activity in the MCF-7 assay greater than or equal to that of bisphenol S. Optimally, the aforementioned ingredients are free of any polyhydric phenols that exhibit an estrogenic agonist activity in the MCF-7 assay greater than or equal to that of 2,2-bis-(4-hydroxyphenyl)-1-propanol.

While not intending to be bound by any theory, it is believed that a polyhydric phenol is less likely to exhibit any appreciable estrogenic agonist activity if the compound's chemical structure is sufficiently different from compounds having estrogenic activity such as diethylstilbestrol. The structures of preferred polyhydric phenol compounds, as will be discussed, are sufficiently different such that the compounds do not bind and activate a human receptor. These preferred compounds are, in some instances, at least about 6 or 7, or even about 8 to 9 or more, orders of magnitude less active than diethylstilbestrol (e.g., when assessing estrogenic agonist effect using an in vitro assay such as the MCF-7 cell proliferation assay). Without being bound by theory, it is believed that such desirable structural dissimilarity can be introduced via one or more structural features, including any suitable combination thereof. For example, it is believed that one or more of the following structural characteristics can be used to achieve such structural dissimilarity:

steric hinderance (e.g., relative to one or more hydroxyl phenols), molecular weight that is arranged in three-dimensional space such that: (i) the compound does not fit, or does not readily fit, in the active site of a human estrogen receptor or (ii) the structural configuration interferes with activation of the human estrogen receptor once inside the active site, and the presence of polar groups.

In one preferred embodiment, the disclosed polycarbonate polymer includes one or more segments of the below Formula (I).

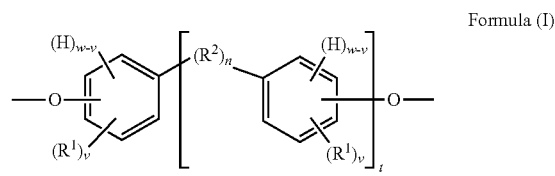

Formula (I)

wherein H, $R^1$, $R^2$, v, w, n and t are as described for Formula (I) above.

When t is 1, the segment of Formula (I) is a segment of the below Formula (IA):

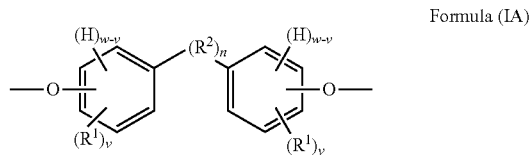

Formula (IA)

When t is 0, the segment of Formula (I) is a segment of the below Formula (IB):

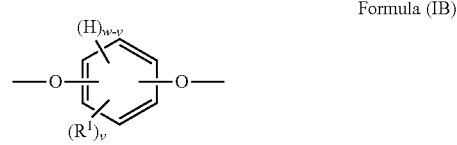

Formula (IB)

As depicted in the above Formula (I), the segment includes at least one phenylene group when t is 0 (illustrated in Formula (IB)) and includes at least two phenylene groups when t is 1 (illustrated in Formula (IA)). The segments of each of Formulas (IA) and (IB) may optionally include one or more additional phenylene or other aryl or heteroaryl groups in addition to those depicted. Although aryl groups having a six-carbon aromatic ring are presently preferred, it is contemplated that any other suitable aryl or heteroaryl groups may be used in place of the phenylene groups depicted in Formula (I). As depicted in the above Formula (I), the substituent groups (e.g., —O—, H, $R^1$, and $R^2$) of each phenylene group can be located at any position on the ring relative to one another, although in certain preferred embodiments at least one $R^1$ is positioned on the ring immediately adjacent to the oxygen atom. In other embodiments in which other aryl or heteroarylene group(s) are used in place of the depicted phenylene group(s) in Formula (I), it is contemplated that the same would hold true for the substituent groups of such other aryl or heteroarylene group(s).

In preferred embodiments, $R^1$ is preferably located at an ortho position on the ring relative to the oxygen atom. In some embodiments, an $R^1$ is located at each ortho position on the ring relative to the oxygen atom. While not intending to be bound by theory, it is believed that the positioning of one or more $R^1$ groups at an ortho position relative to the oxygen atom depicted in Formula (I) may be beneficial in reducing or eliminating estrogenic agonist activity. The benefits of $R^1$ with regards to an absence of appreciable estrogenic activity in certain such potential mobile compounds are discussed in greater detail below.

In another embodiment, the one or more hydroxyl groups present on each aryl ring of a polyhydric phenol compound (typically phenol hydroxyl groups of a bisphenol) are sterically hindered by one or more other substituents of the aryl ring, as compared to a similar polyhydric phenol compound having hydrogen atoms present at each ortho or meta position. It is believed that it may be preferable to have substituent groups positioned at each ortho position relative to the aforementioned hydroxyl groups to provide optimal steric effect. It is believed that the steric hindrance can prevent or limit the ability of a polyhydric phenol compound to act as an agonist for a human estrogen receptor.

Preferred $R^1$ groups are sufficiently "bulky" to provide a suitable level of steric hindrance for the aforementioned hydroxyl groups to achieve the desired effect. To avoid any ambiguity, the term "group" when used in the context of $R^1$ groups refers to either single atoms (e.g., a halogen atom) or molecules (i.e., two or more atoms). The optimal chemical constituents, size, or configuration (e.g., linear, branched, etc.) of the one or more $R^1$ groups may depend on a variety of factors, including, for example, the location of the $R^1$ group on the aryl ring.

Certain preferred segments of Formula (I) include up to four $R^1$ groups having an atomic weight of at least 15 Daltons. In some embodiments, the segments of Formula (I) include up to four $R^1$ groups having an atomic weight of at least 25, at least 40, or at least 50 Daltons. While the maximum suitable size of $R^1$ is not particularly limited, typically it will be less than 500 Daltons, more typically less than 100 Daltons, and even more typically less than 60 Daltons. Non-limiting examples of $R^1$ groups include groups having at least one carbon atom (e.g., organic groups), halogen atoms and sulfur-containing groups.

In presently preferred embodiments, the $R^1$ groups of each phenylene group, if present, preferably include at least one carbon atom, more preferably 1 to 10 carbon atoms, and even more preferably 1 to 4 carbon atoms. $R^1$ will typically be a saturated or unsaturated hydrocarbon group, more typically saturated, that may optionally include one or more heteroatoms other than carbon or hydrogen atoms (e.g., N, O, S, Si, a halogen atom, etc.). Examples of suitable hydrocarbon groups may include substituted or unsubstituted groups including alkyl groups (e.g., methyl, ethyl, propyl, butyl, etc., including isomers thereof), alkenyl groups, alkynyl groups, alicyclic groups, aryl groups, or combinations thereof.

In certain preferred embodiments, each phenylene group depicted in Formula (I) includes at least one alkyl $R^1$ group. As discussed above, any suitable isomer may be used. Thus, for example, a linear butyl group or a branched isomer such as an isobutyl group or a tert-butyl group may be used. In one embodiment, a tert-butyl group (and more preferably a tert-butyl moiety) is a preferred $R^1$ group.

As previously mentioned, it is contemplated that $R^1$ may include one or more cyclic groups. In addition, $R^1$ may form a cyclic or polycyclic group with one or more other $R^1$ groups or $R^2$ groups.

In some embodiments, one or both phenylene groups depicted in Formula (I) include an $R^1$ group that is a halogen atom, located ortho to the oxygen more preferably a higher molecular weight halogen such as bromine or iodine. However, in preferred embodiments, the segment of Formula (I) does not include any halogen atoms. Moreover, in presently preferred embodiments, the polymer including one or more segments of Formula (I) is preferably free of halogen atoms.

In some embodiments, a suitable $R^1$ is selected and positioned at the ortho position such that a width "f" measured perpendicular from a center-line of the phenylene group (or other suitable aryl group) to the maximal outside extent of the van der Waals volume of $R^1$ (corresponding to the radius of the van der Waals radius of $R^1$) is greater than about 4.5 Angstroms. This width measurement may be determined via theoretical calculation using suitable molecular modeling software and is illustrated below.

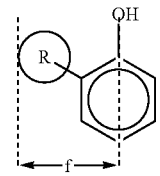

As illustrated above, the centerline for the depicted phenylene group includes the carbon atom to which the phenol hydroxyl group attaches and the para carbon atom. For example, while not intending to be bound by any theory, it is believed that it is generally desirable that f be greater than about 4.5 Angstroms if $R^2$ is a —$C(CH_3)_2$— group. In some embodiments, $R^1$ may be selected and positioned at an ortho position such that f is less than about 4.5 Angstroms. For example, if $R^2$ is a methylene bridge (—$CH_2$—), then in some embodiments $R^1$ can be selected and positioned such that f is less than about 4.5 Angstroms. For example, this is believed to be the case for certain preferred segments of Formula (I) derived from, e.g., 4,4'-methylenebis(2,6-dimethylphenol).

$R^2$ is present or absent in the segment of Formula (IA) depending on whether n is 0 or 1. When $R^2$ is absent, either (i) a carbon atom of one phenylene ring is covalently attached to a carbon atom of the other phenylene ring (which occurs when w is 4) or (ii) the phenylene groups depicted in Formula (IA) join to form a fused ring system (which occurs when w is 3 and the two phenylene groups are so fused). In some embodiments, $R^2$ (or the ring-ring covalent linkage if $R^2$ is absent) is preferably attached to at least one, and more preferably both, phenylene rings at a para position (i.e., 1,4 position) relative to the oxygen atom depicted in Formula (IA). An embodiment of the segment of Formula (IA), in which n is 0, w is 3, and v is independently 0 to 3 such that the two phenylene groups have joined to form a naphthalene group, is depicted below:

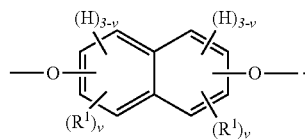

$R^2$ can be any suitable divalent group including, for example, carbon-containing groups (which may optionally include heteroatoms such as, e.g., N, O, P, S, Si, a halogen atom, etc.), sulfur-containing groups (including, e.g., a sulfur atom, a sulfinyl group (—S(O)—), a sulfonyl group (—S(O$_2$)—), etc.), oxygen-containing groups (including, e.g., an oxygen atom, a ketone group, etc.), nitrogen-containing groups, or a combination thereof.

In preferred embodiments of the segment of Formula (IA), $R^2$ is present and is typically an organic group containing less than about 15 carbon atoms, and even more typically 1 or 4-15 carbon atoms. In some embodiments, $R^2$ includes 8 or more carbon atoms. $R^2$ will typically be a saturated or unsaturated hydrocarbon group, more typically a saturated divalent alkyl group, and most preferably an alkyl group that doesn't constrain the movement of the connected phenylene groups in an orientation similar to that of diethylstilbestrol or dienestrol. In some embodiments, $R^2$ may include one or more cyclic groups, which may be aromatic or alicyclic and can optionally include heteroatoms. The one or more optional cyclic groups of $R^2$ can be present, for example, (i) in a chain connecting the two phenylene groups depicted in Formula (IA), (ii) in a pendant group attached to a chain connecting the two phenylene groups, or both (i) and (ii).

The atomic weight of the $R^2$ group, if present, may be any suitable atomic weight. Typically, however, $R^2$ has an atomic weight of less than about 500 Daltons, less than about 400 Daltons, less than about 300 Daltons, or less than about 250 Daltons.

In some embodiments, $R^2$ includes a carbon atom that is attached to a carbon atom of each of the phenylene groups depicted in Formula (I). For example, $R^2$ can have a structure of the formula —C($R^7$)($R^8$)—, wherein $R^7$ and $R^8$ are each independently a hydrogen atom, a halogen atom, an organic group, a sulfur-containing group, a nitrogen-containing group and wherein $R^7$ and $R^8$ can optionally join to form a cyclic group. In some embodiments, at least one of $R^7$ and $R^8$ are hydrogen atoms, and more preferably both. In one preferred embodiment, $R^2$ is a divalent methylene group (—CH$_2$—). While not intending to be bound by theory, it is believed that it may be generally desirable to avoid using an $R^2$ group wherein each of $R^7$ and $R^8$ are methyl (—CH$_3$) groups. It may also be generally desirable to avoid using an $R^2$ group in which $R^7$ and $R^8$ join to form a monocyclic cyclohexyl group.

It is also thought to be generally desirable to avoid using either of the following "constrained" unsaturated structures (i) or (ii) as $R^2$: (i) —C($R^9$)=C($R^9$)— or (ii) —C(=C($R^{10}$)$_y$)—C(=C($R^{10}$)$_y$)—, wherein y is 1 or 2 and each of $R^9$ or $R^{10}$ is independently a hydrogen atom, a halogen atom, an organic group, or a monovalent group. For example, the following unsaturated structures (i) and (ii) are preferably avoided: (i) —C(CH$_2$CH$_3$)=C(CH$_2$CH$_3$)— and (ii) —C(=CHCH$_3$)—C(=CHCH$_3$)—.

While not intending to be bound by theory it is believed that a suitably low atomic weight $R^2$ group such as, e.g., —CH$_2$— (14 Daltons), can help avoid estrogenic activity. In some embodiments where $R^2$ is a —C($R^7$)($R^8$)— group, it may be desirable that $R^2$ have an atomic weight of less than 42 Daltons or less than 28 Daltons. It is also believed that a suitably high atomic weight $R^2$ can also help interfere with the ability of a polyhydric phenol to function as an agonist for a human estrogen receptor. In some embodiments where $R^2$ is a —C($R^7$)($R^8$)— group, it may be desirable that $R^2$ have an atomic weight that is greater than about 125, 150, 175, or 200 Daltons. By way of example, a diphenol compound has been determined to be appreciably non-estrogenic that: (a) is not "hindered" (the phenol hydroxyl groups are not surrounded by ortho hydrogens) and (b) has an $R^2$ group in the form of —C($R^7$)($R^8$)— having an atomic weight greater than 200 Daltons.

While not intending to be bound to theory, preferred $R^2$, groups include divalent groups that promote that the orientation of a polyhydric phenol compound in a three-dimensional configuration that is sufficiently different from 17β-estradiol or other compounds (e.g., diethylstilbestrol) having estrogenic activity. For example, while not intending to be bound to theory, it is believed that the presence of $R^2$ as an unsubstituted methylene bridge (—CH2-) can contribute to the reduction or elimination of estrogenic activity. It is also contemplated that a singly substituted methylene bridge having one hydrogen attached to the central carbon atom of the methylene bridge (—C($R^7$)(H)—; see, e.g. the $R^2$ group of 4,4'-butylidenebis(2-t-butyl-5-methylphenol)) may also contribute such a beneficial effect, albeit perhaps to a lesser extent.

In some embodiments, $R^2$ is of the formula —C($R^7$)($R^8$)— wherein $R^7$ and $R^8$ form a ring that includes one or more heteroatoms. In one such embodiment, the ring formed by $R^7$ and $R^8$ further includes one or more additional cyclic groups such as, e.g., one or more aryl cyclic groups (e.g., two phenylene rings).

In one embodiment, $R^2$ is of the formula —C($R^7$)($R^8$)— wherein at least one of $R^7$ and $R^8$ form a ring with an $R^1$ of the depicted phenylene group. In one such embodiment, each of $R^7$ and $R^8$ forms such a ring with a different depicted phenylene group.

The oxygen atom of a phenylene ring depicted in Formula (I) can be positioned on the ring at any position relative to $R^2$ (or relative to the other phenylene ring if $R^2$ is absent). In some embodiments, the oxygen atom and $R^2$ are located at para positions relative to one another. In other embodiments, the oxygen atom and $R^2$ may be located ortho or meta to one another.

The segments of Formula (I) can be of any suitable size. Typically, the segments of Formula (I) will have an atomic weight of less than 1,000, less than 600, or less than 400 Daltons. More typically, the segments of Formula (I) will have an atomic weight of about 100 to about 400 Daltons.

In preferred embodiments, the substituted phenylene groups of Formula (IA) are symmetric relative to one another. Stated otherwise, the substituted phenylene groups are preferably formed from the same phenol compound, thereby resulting in the same substituent groups on each ring located at the same ring positions. An example of a compound having symmetric phenylene groups is provided below.

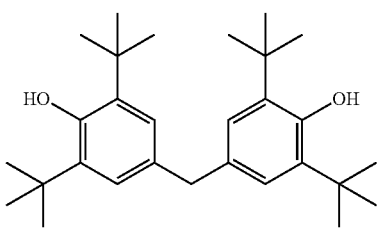 [SMILES: CC(C)(C)c1cc(Cc2cc(C(C)(C)C)c(O)c(C(C)(C)C)c2)cc(C(C)(C)C)c1O]

An example of a compound having phenylene groups that are not symmetric is provided below, in which a methyl group is at a meta position on one ring and at an ortho position on the other.

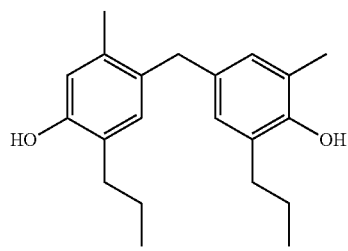 [SMILES: CCCc1cc(Cc2cc(C)c(O)c(CCC)c2)c(C)cc1O]

In some embodiments, the polycarbonate is formed with a polyhydric phenol depicted in the below Formula (II), wherein $R^1$, $R^2$, n, t, v, and w are as in Formula (I):

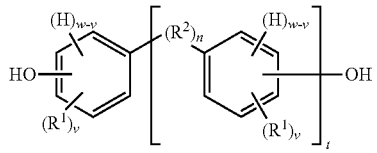

Formula (II)

When t is 1, the compound of Formula (II) is of the below Formula (IIA).

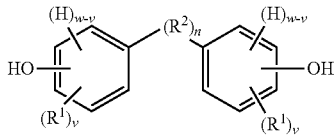

Formula (IIA)

When t is 0, the compound of Formula (II) is of the below Formula (IIB).

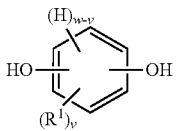

Formula (IIB)

Examples of polyhydric phenol compounds of Formula (IIB) include catechol and substituted catechols (e.g., 3-methylcatechol, 4-methylcatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquionine, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butyl-resorcinol, and the like); and variants and mixtures thereof.

Preferred compounds of Formula (II) do not exhibit appreciable estrogenic activity. Preferred appreciably non-estrogenic compounds exhibit a degree of estrogen agonist activity, in a competent in vitro human estrogen receptor assay, that is preferably less than that exhibited by 4,4'-(propane-2,2-diyl)diphenol in the assay, even more preferably less than that exhibited by bisphenol S in the assay, even more preferably less than that exhibited by 4,4'-(propane-2,2-diyl)bis(2,6-dibromophenol) in the assay, and optimally less than about that exhibited by 2,2-bis(4-hydroxyphenyl)propanoic acid in the assay. It has been found that compounds such as 4,4'-methylenebis(2,6-di-t-butylphenol), 2,2'-methylenebis(4-methyl-6-t-butylphenol), 4,4'-methylenebis(2,6-dimethylphenol), 4,4'butylidenebis(2-t-butyl-5-methylphenol), and 2,5-di-t-butylhydroquinone do not exhibit appreciable estrogenic activity in a suitable in vitro assay whose results are known to be directly correlated to the results of the MCF-7 cell proliferation assay ("MCF-7 assay") through analysis of common reference compounds.

The MCF-7 assay is a useful test for assessing whether a polyhydric phenol compound is appreciably non-estrogenic. The MCF-7 assay uses MCF-7, clone WS8, cells to measure whether and to what extent a substance induces cell proliferation via estrogen receptor (ER)-mediated pathways. The method is described in "Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEATM) on Jan. 19, 2006 (available online at iccvam.niehs.nih.gov/methods/endocrine/endodocs/SubmDoc.pdf).

A brief summary of the method of the aforementioned MCF-7 assay is provided below. MCF-7, clone WS8 cells are maintained at 37° C. in RMPI (or Roswell Park Memorial Institute medium) containing Phenol Red (e.g., GIBCO Catalog Number 11875119) and supplemented with the indicated additives for routine culture. An aliquot of cells maintained at 37° C. are grown for two days in phenol-free media containing 5% charcoal stripped fetal bovine serum in a 25 cm² tissue culture flask. Using a robotic dispenser such as an EPMOTION 5070 unit, MCF-7 cells are then seeded at 400 cells per well in 0.2 ml of hormone-free culture medium in Corning 96-well plates. The cells are adapted for 3 days in the hormone-free culture medium prior to adding the chemical to be assayed for estrogenic activity. The media containing the test chemical is replaced daily for 6 days. At the end of the 7 day exposure to the test chemical, the media is removed, the wells are washed once with 0.2 ml of HBSS (Hanks' Balanced Salt Solution), and then assayed to quantify amounts of DNA per well using a micro-plate modification of the Burton diphenylamine (DPA) assay, which is used to calculate the level of cell proliferation.

Examples of appreciably non-estrogenic polyhydric phenols include polyhydric phenols that when tested using the MCF-7 assay exhibit a Relative Proliferative Effect ("RPE") having a logarithmic value (with base 10) of less than about −2.0, more preferably less than about −3.0, and even more preferably less than about −4.0. RPE is the ratio between the EC50 of the test chemical and the EC50 of the control substance 17-beta estradiol times 100, where EC50 is "effective concentration 50%" or half-maximum stimulation concentration for cell proliferation measured as total DNA in the MCF-7 assay.

Table 1 shown below includes exemplary preferred polyhydric phenol compounds of Formula II and their expected or measured logarithmic RPE values in the MCF-7 assay.

TABLE 1

| Polyhydric Compound of Formula (II) | Structure | Reference Compound | Log RPE |
|---|---|---|---|
| | | 17β-estradiol | 2.00 |
| | | diethylstilbestrol | about 2 |
| | | dienestrol | about 2 |
| | | Genistein | −2 |
| | | Bisphenol S | −2 |
| | | Bisphenol F | −2 |
| 4,4'-isopropylidenebis(2,6-dimethylphenol) | 1 | | −2 |
| 4,4'-(propane-2,2-diyl)bis(2,6-dibromophenol) | 16 | | −3 |
| 4,4'-(ethane-1,2-diyl)bis(2,6-dimethylphenol) | 2 | | −3 |
| 4,4',4''-(ethane-1,1,1-triyl)triphenol | 3 | | −3 |
| 4,4'-(1-phenylethane-1,1-diyl)diphenol | 4 | | −3 |
| 2,2-bis(4-hydroxyphenyl)propanoic acid | 5 | | less than −4 |
| 4,4'-methylenebis(2,6-dimethylphenol) | 6 | | less than −4 |
| 4,4'-butylidenebis(2-t-butyl-5-methylphenol) | 7 | | less than −4 |
| 4,4'-methylenebis(2,6-di-t-butylphenol) | 8 | | less than −4 |
| 2,2'-methylenebis(4-methyl-6-t-butylphenol | 9 | | less than −4 |
| 4,4'-(1,4-phenylenebis(propane-2,2-diyl))diphenol | 10 | | less than −4 |
| 2,2'methylenebis(phenol) | 11 | | less than −4 |
| 2,5-di-t-butylhydroquinone | 12 | | less than −4 |
| 2,2'-Methylenebis(6-(1-methylcyclohexyl)-4-methylphenol | 13 | | less than −4 |
| 2,2'-Methylenebis(6-t-butyl-4-methylphenol) | 14 | | less than −4 |
| 2,2'Methylenebis(4-ethyl-6-t-butylphenol) | 15 | | less than −4 |

Structures 1 through 16 as identified in Table 1 are also shown below:

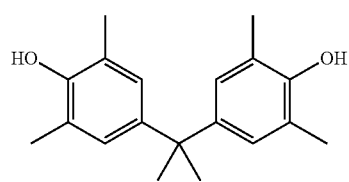

1

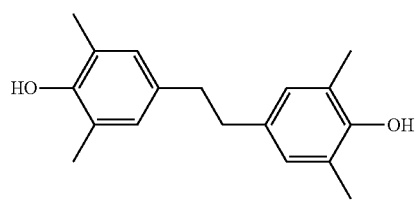

2

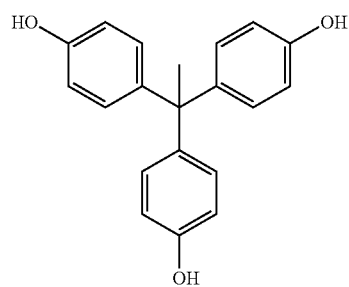

3

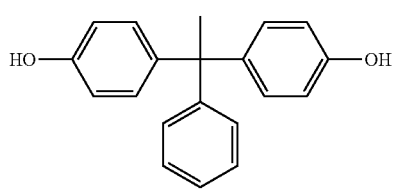

4

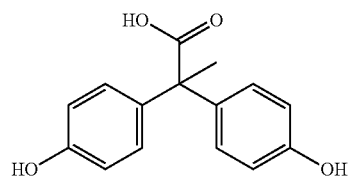

5

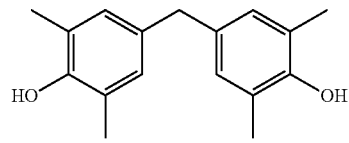

6

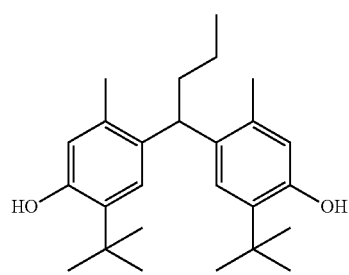

7

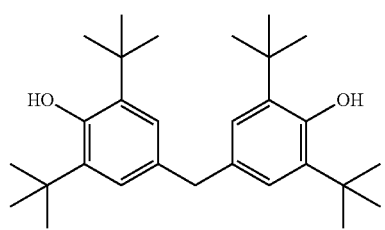

8

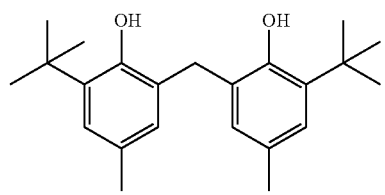

9

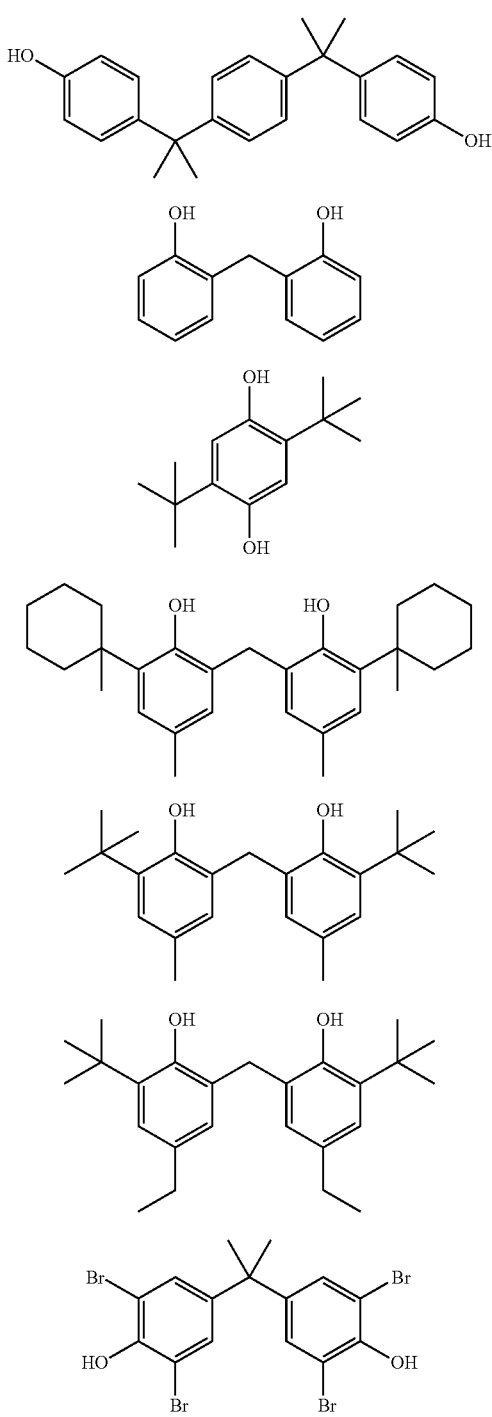

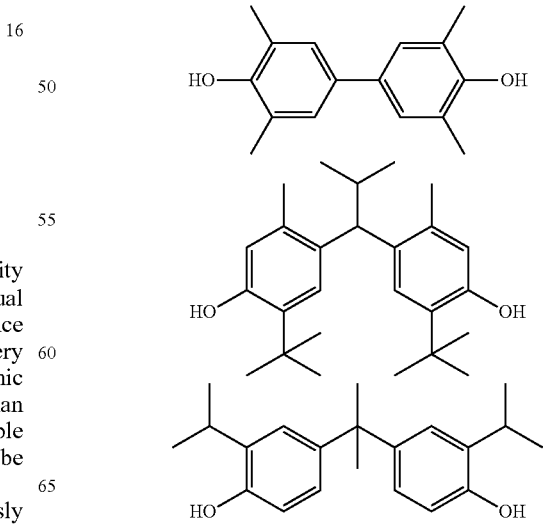

Compounds having no appreciable estrogenic activity may be beneficial in the event that any unreacted, residual compound may be present in a polymer. While the balance of scientific data does not indicate that the presence of very small amounts of residual compounds having estrogenic activity in an in vitro recombinant cell assay pose a human health concern, the use of compounds having no appreciable estrogenic activity in such an assay may nonetheless be desirable from a public perception standpoint.

While not intending to be bound by theory, as previously discussed, it is believed that the presence of substituent groups (i.e., a group other than a hydrogen atom) at one or more of the ortho or meta positions of each phenylene ring of the Formula (II) compound, relative to the phenol hydroxyl group of each ring, can reduce or effectively eliminate any estrogenic activity. It is believed that the inhibition or elimination of estrogenic activity may be attributable to one or more of the following: (a) steric hindrance of the phenol hydroxyl group (which may cause the overall polyhydric phenol structure to be sufficiently different from estrogenically active compounds such as diethylstilbestrol), (b) the compound having an increased molecular weight due to the presence of the one or more substituent groups, (c) the presence of polar groups or (d) ortho hydroxyl groups relative to $R^2$. Substitution at one or both of the ortho positions of each phenylene ring is presently preferred for certain embodiments as it is believed that ortho substitution can provide the greatest steric hindrance for the hydroxyl group.

As previously discussed, structural features other than the presence of suitable $R^1$ groups (e.g., features such as (b), (c), and (d) of the preceding paragraph) are believed to inhibit or eliminate estrogenic activity, even in the absence of any $R^1$ groups.

It is believed that molecular weight may be a structural characteristic pertinent to whether a polyhydric phenol is appreciably non-estrogenic. For example, while not intending to be bound by theory, it is believed that if a sufficient amount of relatively "densely" packed molecular weight is present in a polyhydric phenol, it can prevent the compound from being able to fit into the active site of an estrogen receptor (irrespective of whether the polyhydric phenol includes any ortho or meta $R^1$ groups). The presence of one or more polar groups on the polyhydric phenol compounds of Formula (II) may be beneficial in certain embodiments, particularly for certain embodiments of Formula (IIA). The polar groups may be located at any suitable location of the compounds of Formula (II), including in $R^1$ or $R^2$. Suitable polar groups may include ketone, carboxyl, carbonate, hydroxyl, phosphate, sulfoxide, and the like, any other polar groups disclosed herein, and combinations thereof.

The below compounds of Formula (II) may also be used in certain embodiments if desired.

-continued

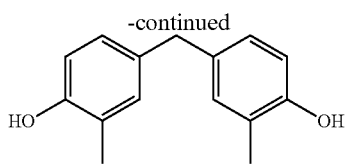

The below compounds are not presently preferred, but may be used in certain embodiments, if desired.

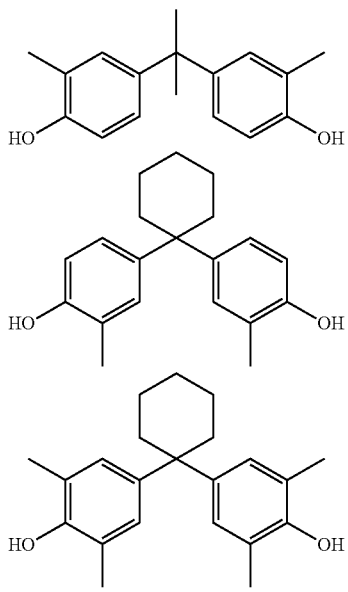

Additional diphenol compounds that may have utility in producing the disclosed polycarbonates are provided below. While the diphenol structures listed below are not "hindered" in the sense of having bulky substituent groups at one or more ortho or meta positions of the phenylene ring(s), it is contemplated that each of the below polyhydric phenol structures may be used in place of, or in addition to, the compounds of Formula (II). Such compounds are believed to be appreciably non-estrogenic for one or more of the reasons previously described herein.

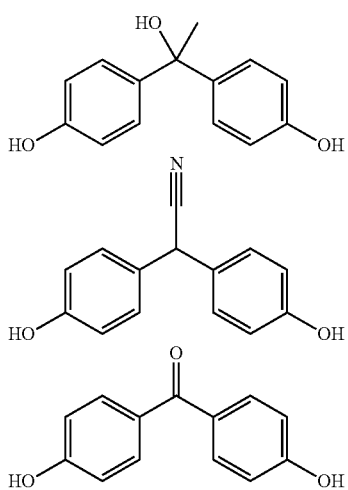

-continued

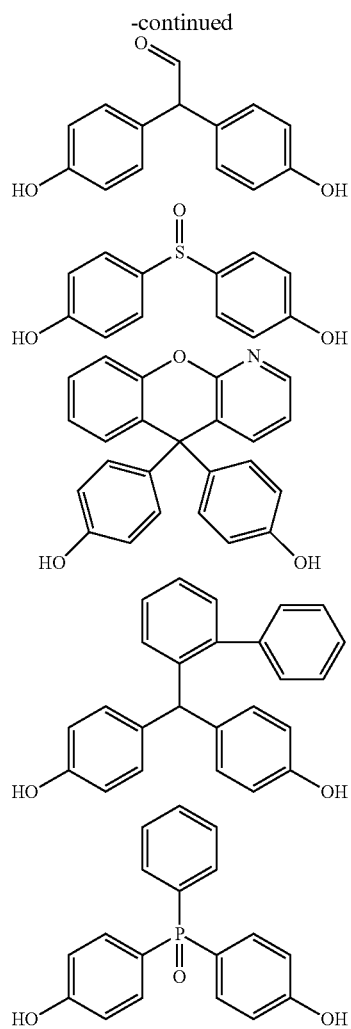

Segments of Formula (I) and the depicted polyhydric phenols wherein each of the depicted phenylene groups include one or two ortho $R^1$ groups (relative to the depicted oxygen atom) are presently preferred. To further illustrate such structures, Table 2 below exemplifies some non-limiting combinations of one or more ortho $R^1$ and $R^2$, if present, for a given phenylene group. Table 2 is non-limiting with respect to the ring position of $R^2$ (e.g., ortho, meta, para), although typically $R^2$, if present, will be located at a para position relative to the oxygen atom. The columns labeled "Ortho Position A" and "Ortho Position B" indicate the $R^1$ group present at each ortho position of the phenylene group (assuming $R^2$ is not located at an ortho position). Positions "A" or "B" can be either ortho position relative to the depicted oxygen atom. If $R^2$ is located at an ortho position of the phenylene group, then the group listed in the "Ortho Position B" column is not present. Typically, though not required, the phenylene groups in a given segment of Formula (IA) or compound of Formula (IIA) will be "symmetric" relative to the second phenylene group such that the same ortho group (as delineated in the ortho position column "A" or "B") is located on each ring at the same ortho position.

Table 2 is also intended as a listing of independent examples of $R^1$ or $R^2$, as well as examples of combinations of $R^1$ and $R^2$ (regardless of whether $R^1$ is ortho or meta relative to the oxygen atom, whether other $R^1$ are present in a particular phenylene group, or whether the one or more W are the same for both of the phenylene groups).

TABLE 2

| Ortho Position "A" | Ortho Position "B" | $R^2$ |
| --- | --- | --- |
| Butyl | Hydrogen | 2-Butylidene |
| Butyl | Methyl | 2-Butylidene |
| Butyl | Ethyl | 2-Butylidene |
| Butyl | Propyl | 2-Butylidene |
| Butyl | isopropyl | 2-Butylidene |
| Butyl | Butyl | 2-Butylidene |
| Ethyl | Hydrogen | 2-Butylidene |
| Ethyl | Methyl | 2-Butylidene |
| Ethyl | Ethyl | 2-Butylidene |
| Isopropyl | Hydrogen | 2-Butylidene |
| Isopropyl | Methyl | 2-Butylidene |
| Isopropyl | Ethyl | 2-Butylidene |
| Isopropyl | Propyl | 2-Butylidene |
| Isopropyl | isopropyl | 2-Butylidene |
| Methyl | Hydrogen | 2-Butylidene |
| Methyl | Methyl | 2-Butylidene |
| Propyl | Hydrogen | 2-Butylidene |
| Propyl | Methyl | 2-Butylidene |
| Propyl | Ethyl | 2-Butylidene |
| Propyl | Propyl | 2-Butylidene |
| sec-Butyl | Hydrogen | 2-Butylidene |
| sec-Butyl | Methyl | 2-Butylidene |
| sec-Butyl | Ethyl | 2-Butylidene |
| sec-Butyl | Propyl | 2-Butylidene |
| sec-Butyl | isopropyl | 2-Butylidene |
| sec-Butyl | Butyl | 2-Butylidene |
| sec-Butyl | sec-Butyl | 2-Butylidene |
| tert-Butyl | Hydrogen | 2-Butylidene |
| tert-Butyl | Methyl | 2-Butylidene |
| tert-Butyl | Ethyl | 2-Butylidene |
| tert-Butyl | Propyl | 2-Butylidene |
| tert-Butyl | isopropyl | 2-Butylidene |
| tert-Butyl | Butyl | 2-Butylidene |
| tert-Butyl | sec-Butyl | 2-Butylidene |
| tert-Butyl | tert-Butyl | 2-Butylidene |
| Butyl | Hydrogen | Butylene |
| Butyl | Methyl | Butylene |
| Butyl | Ethyl | Butylene |
| Butyl | Propyl | Butylene |
| Butyl | isopropyl | Butylene |
| Butyl | Butyl | Butylene |
| Ethyl | Hydrogen | Butylene |
| Ethyl | Methyl | Butylene |
| Ethyl | Ethyl | Butylene |
| Isopropyl | Hydrogen | Butylene |
| Isopropyl | Methyl | Butylene |
| Isopropyl | Ethyl | Butylene |
| Isopropyl | Propyl | Butylene |
| Isopropyl | isopropyl | Butylene |
| Methyl | Hydrogen | Butylene |
| Methyl | Methyl | Butylene |
| Propyl | Hydrogen | Butylene |
| Propyl | Methyl | Butylene |
| Propyl | Ethyl | Butylene |
| Propyl | Propyl | Butylene |
| sec-Butyl | Hydrogen | Butylene |
| sec-Butyl | Methyl | Butylene |
| sec-Butyl | Ethyl | Butylene |
| sec-Butyl | Propyl | Butylene |
| sec-Butyl | isopropyl | Butylene |
| sec-Butyl | Butyl | Butylene |
| sec-Butyl | sec-Butyl | Butylene |
| tert-Butyl | Hydrogen | Butylene |
| tert-Butyl | Methyl | Butylene |
| tert-Butyl | Ethyl | Butylene |
| tert-Butyl | Propyl | Butylene |
| tert-Butyl | isopropyl | Butylene |
| tert-Butyl | Butyl | Butylene |
| tert-Butyl | sec-Butyl | Butylene |
| tert-Butyl | tert-Butyl | Butylene |
| Butyl | Hydrogen | Ethylidene |
| Butyl | Methyl | Ethylidene |
| Butyl | Ethyl | Ethylidene |
| Butyl | Propyl | Ethylidene |
| Butyl | isopropyl | Ethylidene |
| Butyl | Butyl | Ethylidene |
| Ethyl | Hydrogen | Ethylidene |
| Ethyl | Methyl | Ethylidene |
| Ethyl | Ethyl | Ethylidene |
| Isopropyl | Hydrogen | Ethylidene |
| Isopropyl | Methyl | Ethylidene |
| Isopropyl | Ethyl | Ethylidene |
| Isopropyl | Propyl | Ethylidene |
| Isopropyl | isopropyl | Ethylidene |
| Methyl | Hydrogen | Ethylidene |
| Methyl | Methyl | Ethylidene |
| Propyl | Hydrogen | Ethylidene |
| Propyl | Methyl | Ethylidene |
| Propyl | Ethyl | Ethylidene |
| Propyl | Propyl | Ethylidene |
| sec-Butyl | Hydrogen | Ethylidene |
| sec-Butyl | Methyl | Ethylidene |
| sec-Butyl | Ethyl | Ethylidene |
| sec-Butyl | Propyl | Ethylidene |
| sec-Butyl | isopropyl | Ethylidene |
| sec-Butyl | Butyl | Ethylidene |
| sec-Butyl | sec-Butyl | Ethylidene |
| tert-Butyl | Hydrogen | Ethylidene |
| tert-Butyl | Methyl | Ethylidene |
| tert-Butyl | Ethyl | Ethylidene |
| tert-Butyl | Propyl | Ethylidene |
| tert-Butyl | isopropyl | Ethylidene |
| tert-Butyl | Butyl | Ethylidene |
| tert-Butyl | sec-Butyl | Ethylidene |
| tert-Butyl | tert-Butyl | Ethylidene |
| Butyl | Hydrogen | Methylidene |
| Butyl | Methyl | Methylidene |
| Butyl | Ethyl | Methylidene |
| Butyl | Propyl | Methylidene |
| Butyl | isopropyl | Methylidene |
| Butyl | Butyl | Methylidene |
| Ethyl | Hydrogen | Methylidene |
| Ethyl | Methyl | Methylidene |
| Ethyl | Ethyl | Methylidene |
| Isopropyl | Hydrogen | Methylidene |
| Isopropyl | Methyl | Methylidene |
| Isopropyl | Ethyl | Methylidene |
| Isopropyl | Propyl | Methylidene |
| Isopropyl | isopropyl | Methylidene |
| Methyl | Hydrogen | Methylidene |
| Methyl | Methyl | Methylidene |
| Propyl | Hydrogen | Methylidene |
| Propyl | Methyl | Methylidene |
| Propyl | Ethyl | Methylidene |
| Propyl | Propyl | Methylidene |
| sec-Butyl | Hydrogen | Methylidene |
| sec-Butyl | Methyl | Methylidene |
| sec-Butyl | Ethyl | Methylidene |
| sec-Butyl | Propyl | Methylidene |
| sec-Butyl | isopropyl | Methylidene |
| sec-Butyl | Butyl | Methylidene |
| sec-Butyl | sec-Butyl | Methylidene |
| tert-Butyl | Hydrogen | Methylidene |
| tert-Butyl | Methyl | Methylidene |
| tert-Butyl | Ethyl | Methylidene |
| tert-Butyl | Propyl | Methylidene |
| tert-Butyl | isopropyl | Methylidene |
| tert-Butyl | Butyl | Methylidene |
| tert-Butyl | sec-Butyl | Methylidene |
| tert-Butyl | tert-Butyl | Methylidene |
| Butyl | Hydrogen | Propylidene |
| Butyl | Methyl | Propylidene |
| Butyl | Ethyl | Propylidene |
| Butyl | Propyl | Propylidene |
| Butyl | isopropyl | Propylidene |
| Butyl | Butyl | Propylidene |
| Ethyl | Hydrogen | Propylidene |
| Ethyl | Methyl | Propylidene |
| Ethyl | Ethyl | Propylidene |
| Isopropyl | Hydrogen | Propylidene |
| Isopropyl | Methyl | Propylidene |

TABLE 2-continued

| Ortho Position "A" | Ortho Position "B" | R² |
|---|---|---|
| Isopropyl | Ethyl | Propylidene |
| Isopropyl | Propyl | Propylidene |
| Isopropyl | isopropyl | Propylidene |
| Methyl | Hydrogen | Propylidene |
| Methyl | Methyl | Propylidene |
| Propyl | Hydrogen | Propylidene |
| Propyl | Methyl | Propylidene |
| Propyl | Ethyl | Propylidene |
| Propyl | Propyl | Propylidene |
| sec-Butyl | Hydrogen | Propylidene |
| sec-Butyl | Methyl | Propylidene |
| sec-Butyl | Ethyl | Propylidene |
| sec-Butyl | Propyl | Propylidene |
| sec-Butyl | isopropyl | Propylidene |
| sec-Butyl | Butyl | Propylidene |
| sec-Butyl | sec-Butyl | Propylidene |
| tert-Butyl | Hydrogen | Propylidene |
| tert-Butyl | Methyl | Propylidene |
| tert-Butyl | Ethyl | Propylidene |
| tert-Butyl | Propyl | Propylidene |
| tert-Butyl | isopropyl | Propylidene |
| tert-Butyl | Butyl | Propylidene |
| tert-Butyl | sec-Butyl | Propylidene |
| tert-Butyl | tert-Butyl | Propylidene |
| Butyl | Hydrogen | 1-Phenylethylidene |
| Butyl | Methyl | 1-Phenylethylidene |
| Butyl | Ethyl | 1-Phenylethylidene |
| Butyl | Propyl | 1-Phenylethylidene |
| Butyl | isopropyl | 1-Phenylethylidene |
| Butyl | Butyl | 1-Phenylethylidene |
| Ethyl | Hydrogen | 1-Phenylethylidene |
| Ethyl | Methyl | 1-Phenylethylidene |
| Ethyl | Ethyl | 1-Phenylethylidene |
| Isopropyl | Hydrogen | 1-Phenylethylidene |
| Isopropyl | Methyl | 1-Phenylethylidene |
| Isopropyl | Ethyl | 1-Phenylethylidene |
| Isopropyl | Propyl | 1-Phenylethylidene |
| Isopropyl | isopropyl | 1-Phenylethylidene |
| Methyl | Hydrogen | 1-Phenylethylidene |
| Methyl | Methyl | 1-Phenylethylidene |
| Propyl | Hydrogen | 1-Phenylethylidene |
| Propyl | Methyl | 1-Phenylethylidene |
| Propyl | Ethyl | 1-Phenylethylidene |
| Propyl | Propyl | 1-Phenylethylidene |
| sec-Butyl | Hydrogen | 1-Phenylethylidene |
| sec-Butyl | Methyl | 1-Phenylethylidene |
| sec-Butyl | Ethyl | 1-Phenylethylidene |
| sec-Butyl | Propyl | 1-Phenylethylidene |
| sec-Butyl | isopropyl | 1-Phenylethylidene |
| sec-Butyl | Butyl | 1-Phenylethylidene |
| sec-Butyl | sec-Butyl | 1-Phenylethylidene |
| tert-Butyl | Hydrogen | 1-Phenylethylidene |
| tert-Butyl | Methyl | 1-Phenylethylidene |
| tert-Butyl | Ethyl | 1-Phenylethylidene |
| tert-Butyl | Propyl | 1-Phenylethylidene |
| tert-Butyl | isopropyl | 1-Phenylethylidene |
| tert-Butyl | Butyl | 1-Phenylethylidene |
| tert-Butyl | sec-Butyl | 1-Phenylethylidene |
| tert-Butyl | tert-Butyl | 1-Phenylethylidene |
| Butyl | Hydrogen | Diphenylmethylidene |
| Butyl | Methyl | Diphenylmethylidene |
| Butyl | Ethyl | Diphenylmethylidene |
| Butyl | Propyl | Diphenylmethylidene |
| Butyl | isopropyl | Diphenylmethylidene |
| Butyl | Butyl | Diphenylmethylidene |
| Ethyl | Hydrogen | Diphenylmethylidene |
| Ethyl | Methyl | Diphenylmethylidene |
| Ethyl | Ethyl | Diphenylmethylidene |
| Isopropyl | Hydrogen | Diphenylmethylidene |
| Isopropyl | Methyl | Diphenylmethylidene |
| Isopropyl | Ethyl | Diphenylmethylidene |
| Isopropyl | Propyl | Diphenylmethylidene |
| Isopropyl | isopropyl | Diphenylmethylidene |
| Methyl | Hydrogen | Diphenylmethylidene |
| Methyl | Methyl | Diphenylmethylidene |
| Propyl | Hydrogen | Diphenylmethylidene |
| Propyl | Methyl | Diphenylmethylidene |
| Propyl | Ethyl | Diphenylmethylidene |
| Propyl | Propyl | Diphenylmethylidene |
| sec-Butyl | Hydrogen | Diphenylmethylidene |
| sec-Butyl | Methyl | Diphenylmethylidene |
| sec-Butyl | Ethyl | Diphenylmethylidene |
| sec-Butyl | Propyl | Diphenylmethylidene |
| sec-Butyl | isopropyl | Diphenylmethylidene |
| sec-Butyl | Butyl | Diphenylmethylidene |
| sec-Butyl | sec-Butyl | Diphenylmethylidene |
| tert-Butyl | Hydrogen | Diphenylmethylidene |
| tert-Butyl | Methyl | Diphenylmethylidene |
| tert-Butyl | Ethyl | Diphenylmethylidene |
| tert-Butyl | Propyl | Diphenylmethylidene |
| tert-Butyl | isopropyl | Diphenylmethylidene |
| tert-Butyl | Butyl | Diphenylmethylidene |
| tert-Butyl | sec-Butyl | Diphenylmethylidene |
| tert-Butyl | tert-Butyl | Diphenylmethylidene |

In preferred embodiments, a reaction of a polyhydric phenol of Formula II with a carbonate precursor yields a reaction product that includes a polycarbonate having the structure shown in Formula (III):

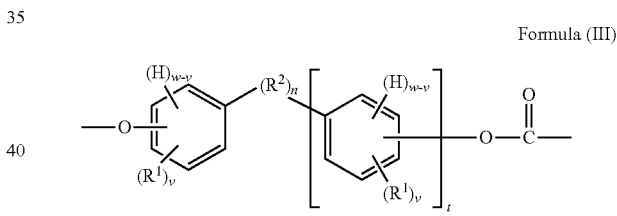

Formula (III)

In yet another embodiment, the disclosed polyhydric phenols may be further reacted with disubstituted phenol compounds through oxidative coupling before reacting with selected carbonate precursors. For example, one or more moles of a 2,6-dimethylphenol may be oxidatively coupled to one or both ends of a polyhydric phenol compound of Formula II for the purpose of increasing molecular weight, raising the Tg, improving chemical resistance, improving hydrolytic resistance or any other desired property. When coupled to both ends the resulting will be a compound of Formula IV:

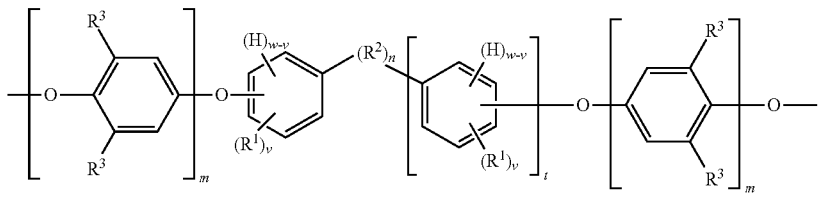

Where H, $R^1$, $R^2$, v, w, n and t are as described for Formula I above and each m is independently one or more and each $R^3$ is independently an alkyl group. In some embodiments, $R^2$ may be a substituted or unsubstituted tricyclodecane group.

The disclosed polycarbonates may include any suitable terminal groups, including, for example, epoxy or hydroxyl groups (e.g., a hydroxyl group attached to a terminal aryl or heteroaryl ring, carbamate groups, blocked amine groups or a combination thereof.

Preferred polycarbonate polymers may be made in a variety of molecular weights, such as having, for example, a number average molecular weight (Mn) ranging from about 2,000 to 65,000, as determined e.g., by gel permeation chromatography (GPC). The molecular weight of the polymer may be as high as is needed for the desired application. In some embodiments, the number average molecular weight of the polycarbonate ranges from about 25,000 to about 40,000.

The disclosed polycarbonates can have a number of desirable properties, including high Tg, good ductility, thermal stability, optical clarity, absence of color, resistance to yellowing and low shrinkage. The disclosed polycarbonates may have Tg values from about 20° C. to about 200° C. In some embodiments, the Tg is 50° C. or greater, 100° C. or greater, or 150° C. or greater.

The disclosed polycarbonates may be prepared by any known process to those skilled in the art such as the interfacial process or the transesterification process described in Kirk-Othmer Encyclopedia of Chemical Technology, 5th Edition, Volume 19, page 1-28 hereby incorporated by reference in its entirety; for the interfacial process, see also for example U.S. Pat. Nos. 3,153,008 and 4,368,315 and for the transestrification process, see for example U.S. Pat. No. 5,496,921, each of which is hereby incorporated by reference in its entirety.

The reaction can be conducted as a batch, a semi-continuous, or a continuous process. Any appropriate apparatus can be used for the reaction. The material and the structure of the reactor used are not particularly limited as long as the reactor has stirring capability. It is preferable that the reactor is capable of stirring in high viscosity conditions as the reaction system viscosity increases in later reaction stages.

A variety of carbonate precursors may be used. Exemplary carbonyl halides include carbonyl bromide, carbonyl chloride, and mixtures thereof. Carbonyl chloride (phosgene) is preferred.

Exemplary carbonate esters include diaryl carbonate compounds, dialkyl carbonate compounds, and alkylaryl carbonate compounds. Typical carbonate ester derived compounds are diesters of carbonic acid and include, but are not limited to, diphenyl carbonate; bis(4-t-butylphenyl)carbonate; bis(2,4-dichlorophenyl)carbonate; bis(2,4,6-trichlorophenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof. Of these, diphenyl carbonate is preferred. If two or more of these compounds are utilized, it is common that at least one is diphenyl carbonate.

Exemplary bishaloformates include the bishaloformates of polyhydric phenols such as bischloroformates of, 2,2-bis(4-hydroxy-3,5-dichlorophenyl)propane, hydroquinone, and the like, or bishaloformates of glycols such as bishaloformates of ethylene glycol, and the like.

Typically used water immiscible solvents in the interfacial process include methylene chloride, 1,2-dichloroethane, chlorobenzene, toluene, and the like.

Exemplary catalysts suitable for the interfacial process include tertiary amines such as triethylamine, quaternary phosphonium compounds, quaternary ammonium compounds, and the like.

Exemplary catalyst suitable for the melt or transestrification process include basic catalysts such as sodium, lithium, potassium and the like. Other catalysts include tetraalkylammonium, or tatraalkylphosphonium hydroxides or carbonates.

A molecular weight regulator, e.g. a chain stopper, is generally added to the reactants prior to or during the contacting of the reactants with the carbonate precursor. Useful molecular weight regulators include, but are not limited to, monohydric phenols such as phenol, chroman-I, p-tert-butylphenol, p-cumylphenol and the like.

Compounds that act as chain terminators for polycarbonates may be used and include, for example, alkanol amines (see e.g. U.S. Pat. No. 3,085,992); imides (see U.S. Pat. No. 3,399,172); aniline and methyl aniline function (see e.g. U.S. Pat. No. 3,275,601); and primary and secondary amines as molecular weight regulators (see e.g. U.S. Pat. No. 4,011,184).

The disclosed polycarbonates may also be prepared using a terminating amount of ammonia, ammonium compounds, primary cycloalkyl, aliphatic or aralkyl amines and secondary cycloalkyl, alkyl or aralkyl amines.

The disclosed polycarbonates may additionally include adjuvants suitable for use with polycarbonates, such as heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, flame retardants, inorganic fillers and the like. Such adjuvants may optionally have reactive functionality so that they will be copolymerized with the polycarbonate. Other optional ingredients that do not adversely affect the disclosed polycarbonate may be included to enhance polycarbonate esthetics; to facilitate manufacturing, processing, handling, and application of the polycarbonate; and to further improve a particular functional property of the polycarbonate. For example, the disclosed polycarbonate may optionally include crosslinkers, surfactants, coalescents, extenders, flow control agents, thixotropic agents, dispersing agents, antioxidants, adhesion promoters, and mixtures thereof, as required to provide the desired properties. Each optional ingredient is included in a sufficient amount to serve its intended purpose, but not in such an amount to adversely affect the polycarbonate.

In some embodiments, the polycarbonates may be homopolycarbonates, for example, the polycarbonates may be synthesized using only one type of polyhydric phenol. In other embodiments, the polycarbonate may be a copolycarbonate, for example, a polycarbonate synthesized using more than one type of polyhydric phenol. In other embodiments, the polycarbonate may include a blend of two or more polycarbonates differing from one another either in structural units or in molecular weight or both. In other embodiments, the polycarbonate may be synthesized using one or more types of the disclosed polyhydric phenol(s) and other polyols (e.g. cyclohexanedimethanol, butylethylpropanediol, tricyclodecanedimethylol, etc). In yet other embodiments, the polycarbonates may be blends with other compounds such as polyesters and the like.

Preferred polycarbonates are substantially free of mobile BPA and more preferably essentially free of BPA, and most preferably completely free of BPA. The material is also preferably substantially free of bound BPA and BPS, more preferably essentially free of these compounds, and optimally completely free of these compounds.

The disclosed polycarbonates may be used to make beverage contact or food contact articles. These articles may be made by any molding process including for example, injection molding, injection blow molding, injection stretch blow molding or the like. The disclosed polycarbonates may also be processed into a film or sheet suitable for use as the polycarbonate layer in monolayer or multilayer articles. The layers may be formed into a pre-assembly (sometimes referred to as a film pre-assembly). The multilayer article is then formed by subsequently fabricating, for example, by laminating the pre-assembly with a polycarbonate layer or other polymer layers. The pre-assembly film or multilayer article may be fabricated by one or more steps of co extrusion of films, sheets, lamination, extrusion coating lamination, injection molding (e.g. in-mold decoration), or solvent or melt coating.

The disclosed polycarbonates may have a variety of properties including high impact strength, moderate to high glass transition temperatures, chemical resistance, hydrolytic stability, toughness, low ductile-to-brittle transition temperatures, good color and clarity, low densities, long crystallization half-times, and good processability thereby easilypermitting them to be formed into articles. The invention is further illustrated in the following non-limiting examples.

EXAMPLES

Example 1

A 500 mL Morton flask may be equipped with a magnetic stirrer, reflux condenser, dual nitrogen and phosgene inlet tube and exit tube attached to a base scrubbing system and may be charged with bis-(3,5-dimethyl-4-dydroxyphenyl)-methane (TMBPF) (21.4 g, 72.3 mmol), p-cumylphenol (0.82 g, 3.9 mmol, 4.5 mol %), methylene chloride (110 mL) and distilled water (80 mL). The reaction mixture may be treated with 50 wt % NaOH to bring the pH to 10.5. Phosgene (17.0 g, 170 mmol, 100 mol % excess) may be added at 0.6 g/min maintaining the pH at 10.5 by the addition of the NaOH solution. The phosgene solution may be treated with triethylamine (0.20 mL, 2 mol %) and a vigorous reflux may ensue. The pH may be maintained at 10.5. Under these conditions an analytical test for chloroformates may indicate their complete absence after about 2 min. The resultant polymer solution may be separated from the brine and may be washed once with 1N HCl and four times with distilled water. The polymer solution may be precipitated into boiling water (750 mL) in a blender, and washed with water (500 mL) and dried overnight at 125. C.under vacuum.

Example 2

A 1-liter glass melt polymerization reactor, which may be passivated by acid washing, rinsing and drying overnight at 70° C., may be loaded with 136.9 g (639 mmol) of diphenyl carbonate and 157.5 g (531 mmol) of TMBPF. A 316 stainless steel helical stirrer may be suspended in the powder and 151 microliters of tetramethylammonium hydroxide in the form of a 1.0 M aqueous solution and 461 microliters of sodium hydroxide in the form of a 0.001 M aqueous solution may be added. The vessel may be then evacuated and purged with nitrogen three times and heated to 180° C., whereupon the reaction mixture may melt. Upon complete melting, it may be allowed to thermally equilibrate for 5-10 minutes and then the mixture may be heated at 210° C. for 30 minutes with stirring. The pressure may be then reduced to 240 millibar, whereupon phenol may begin to distill from the reactor. After 45 minutes, the pressure may be reduced to 130 millibar and heating (at 240° C. may be continued for 45 minutes with continued distillation of phenol.

Polymerization may be continued further with the following temperature/pressure profile: 260° C./90 millibar (30 minutes); 260° C./20 millibar (15 minutes); 270° C./3 millibar (30 minutes); 270° C./1 millibar (40 minutes); 300/1 millibar (90 minutes); 310° C./1 millibar (30 minutes). The polymer then may be stranded from the reactor and cooled to give slightly yellow strands.

Comparison Examples A & B and Examples 3-12

Using the method of Example 2, additional polycarbonates may be prepared by replacing the polyhydric phenol in Example 2 with the polyhydric phenols shown in Table 3.

TABLE 3

| Examples | Ingredients |
|---|---|
| Comparison Example A | Bisphenol A |
| Comparison Example B | Bisphenol S |
| Example 3 | 4,4'-(propane-2,2-diyl)bis(2,6-dimethylphenol) |
| Example 4 | 4,4'-methylenebis(2,6-dimethylphenol) |
| Example 5 | 4,4'-(ethane-1,2-diyl)bis(2,6-dimethylphenol) |
| Example 6 | 4,4'-butylidenebis(2-t-butyl-5-methylphenol) |
| Example 7 | 4,4'-methylenebis(2,6-di-t-butylphenol) |
| Example 8 | 2,2'-methylenebis(4-methyl-6-t-butylphenol |
| Example 9 | 4,4'-(ethane-1,2-diyl)bis(2,6-dimethylphenol) |
| Example 10 | Tetrabromobisphenol A* |
| Example 11 | bis-(3,5-dimethyl-4-hydroxyphenyl)-methane |
| Example 12 | bis-(3,5-dimethyl-4-dydroxyphenyl)-methane and 4,4'-(propane-2,2-diyl)bis(2,6-dimethylphenol |

The resulting polycarbonates may show properties comparable to conventional BPA-derived polycarbonates and have no or reduced estrogenicity.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A food contact or beverage contact polycarbonate article comprising a polycarbonate comprising a reaction product of a polyhydric phenol and a carbonate precursor, wherein the polyhydric phenol comprises:
   a polyhydric phenol having two aryl or heteroaryl groups in which each aryl or heteroaryl group includes a hydroxyl group attached to the ring and at least one methyl substituent group attached to the ring at an ortho position relative to the hydroxyl group and wherein the substituent group is free of halogen; and the aryl or heteroaryl groups are joined through a methylene group; and the polycarbonate is substantially free of polyhydric phenols having estrogenic activity greater than or equal to that of bisphenol S.

2. The article of claim 1, wherein each aryl or heteroaryl group includes a two methyl substituent groups attached to the ring at the ortho positions relative to the hydroxyl group.

3. The article of claim 1, wherein the polycarbonate contains one or more segments of Formula (I):

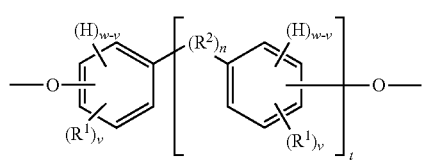

Formula (I)

wherein:
each of the oxygen atoms depicted in Formula (I) is part of a carbonate linkage;
H denotes a hydrogen atom, if present;
each $R^1$ is independently an atom or group having an atomic weight of at least 15 Daltons and at least one $R^1$ group is a methyl group attached to the phenylene ring at an ortho position relative to the oxygen atom;
v is independently 1 to 4;
w is 4;
$R^2$ is a divalent methylene group;
n is 1;
t is 1; and
the polycarbonate is substantially free of polyhydric phenols having estrogenic activity greater than or equal to that of bisphenol S.

4. The article of claim 3, wherein each of the phenylene groups depicted in Formula (I) includes at least one $R^1$ methyl group attached to the phenylene ring at an ortho position relative to the oxygen atom.

5. The article of claim 3, wherein $R^1$ methyl groups are attached to the phenylene ring at both ortho positions relative to the oxygen atom.

6. The article of claim 3, wherein an $R^1$ group independently comprises an ethyl group attached to the phenylene ring at an ortho position relative to the oxygen atom.

7. The article of claim 3, wherein a width measured perpendicular from a centerline of the phenylene ring to the maximal outside extent of the van der Waals volume of $R^1$ is greater than about 4.5 Angstroms.

8. The article of claim 3, wherein each $R^1$ group is free of halogen atoms.

9. The article of claim 3, wherein:
the oxygen atom of each phenylene group depicted in Formula (I) is located at a para position relative to $R^2$.

10. The article of claim 3, wherein the segment of Formula (I) is derived from 4,4'-methylenebis(2,6-dimethylphenol).

11. The article of claim 1, wherein the polyhydric phenol or derivative thereof exhibits a log Relative Proliferative Effect value in an MCF-7 cell proliferation assay less than that of bisphenol S.

12. The article of claim 1, wherein the polycarbonate comprises a layer in a monolayer or multilayer article.

13. The article of claim 1, wherein the article is a baby bottle, sports bottle, water bottle, mug, jug or glass.

14. The article of claim 1, wherein the article is selected from food packaging, cookware, cutlery, tableware, and food processing machinery and equipment.

15. A method of making a food contact or beverage contact article comprising a polycarbonate polymer, comprising:
reacting a carbonate precursor and a polyhydric phenol of Formula (II):

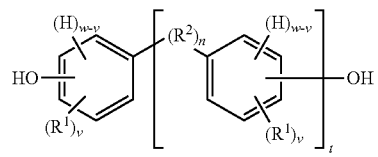

Formula (II)

wherein:
H denotes a hydrogen atom, if present;
each $R^1$ is independently an atom or group having an atomic weight of at least 15 Daltons and at least one $R^1$ group is a methyl group attached to the phenylene ring at an ortho position relative to the oxygen atom;
v is independently 1 to 4;
w is 4;
$R^2$ is a divalent methylene group;
n is 1;
t is 1; and
the polycarbonate is substantially free of polyhydric phenols having estrogenic activity greater than or equal to that of bisphenol S.

16. The method of claim 15, further comprising forming the polycarbonate polymer into a food or beverage contact surface of such article by molding, film or sheet formation, lamination or coating.

17. The method of claim 15, wherein each of the phenylene groups depicted in Formula (II) includes at least one $R^1$ methyl group attached to the phenylene ring at an ortho position relative to the hydroxyl group.

18. The method of claim 15, wherein $R^1$ methyl groups are attached to the phenylene ring at both ortho positions relative to the hydroxyl group.

19. The method of claim 15, wherein an $R^1$ group independently comprises an ethyl group attached to the phenylene ring at an ortho position relative to the hydroxyl group.

20. The method of claim 15, wherein each $R^1$ group is free of halogen atoms.

21. The article of claim 1, wherein the carbonate precursor comprises a carbonyl halide, carbonate ester derived from mono-functional alcohols or phenols or mixtures thereof, or bishaloformate.

* * * * *